United States Patent
Wang et al.

(10) Patent No.: US 12,031,037 B2
(45) Date of Patent: Jul. 9, 2024

(54) RUBBER PROTECTIVE WAX, PREPARATION METHOD AND APPLICATION THEREOF

(71) Applicant: Sennics Co., Ltd., Shanghai (CN)

(72) Inventors: Hao Wang, Shanghai (CN); Yang Gao, Shanghai (CN); Yousheng He, Shanghai (CN)

(73) Assignee: Sennics Co., Ltd., Shanghai (CN)

(*) Notice: Subject to any disclaimer, the term of this patent is extended or adjusted under 35 U.S.C. 154(b) by 124 days.

(21) Appl. No.: 17/547,214

(22) Filed: Dec. 9, 2021

(65) Prior Publication Data
US 2023/0042687 A1 Feb. 9, 2023

(30) Foreign Application Priority Data
Jul. 28, 2021 (CN) .......................... 202110858909.0

(51) Int. Cl.
| | | |
|---|---|---|
| *C08L 9/00* | (2006.01) | |
| *C08K 5/01* | (2006.01) | |
| *C08K 5/18* | (2006.01) | |
| *C08L 7/00* | (2006.01) | |
| *C08L 23/06* | (2006.01) | |
| *C08L 91/06* | (2006.01) | |

(52) U.S. Cl.
CPC .................. *C08L 9/00* (2013.01); *C08K 5/01* (2013.01); *C08K 5/18* (2013.01); *C08L 7/00* (2013.01); *C08L 91/06* (2013.01); *C08K 2201/002* (2013.01); *C08L 23/06* (2013.01)

(58) Field of Classification Search
CPC .... C08L 9/00; C08L 7/00; C08L 91/06; C08L 23/06; C08K 5/01; C08K 5/18; C08K 2201/002

See application file for complete search history.

(56) References Cited

FOREIGN PATENT DOCUMENTS

| | | | |
|---|---|---|---|
| CA | 112300440 A | | 2/2021 |
| CN | 1760278 A | | 4/2006 |
| CN | 1331946 C | * | 8/2007 |
| CN | 101649119 A | | 2/2010 |
| CN | 103865277 A | | 6/2014 |
| CN | 110628228 A | | 12/2019 |

OTHER PUBLICATIONS

English language machine translation for CN 1331946 (Year: 2007).*
GB/T 446-2010, "Fully refined paraffin wax," National Standard of People's Republic of China, published on Sep. 2, 2010.
SH/T 0013-2008, "Microcrystalline wax," National Standard for the Petrochemical Industry of People's Republic of China, published on Apr. 23, 2008.

* cited by examiner

*Primary Examiner* — Angela C Scott
(74) *Attorney, Agent, or Firm* — Mei & Mark LLP; Manni Li

(57) ABSTRACT

A rubber protective wax, comprising hydrocarbon compounds, a polyethylene wax and an antidegradant. The rubber protective wax of the present invention can render rubber good thermal oxidative aging resistance, static ozone aging resistance, dynamic ozone aging resistance, flex cracking resistance and tensile fatigue resistance, and has good protection effects in both static environment and dynamic load environment.

18 Claims, No Drawings

RUBBER PROTECTIVE WAX, PREPARATION METHOD AND APPLICATION THEREOF

CROSS-REFERENCE TO RELATED APPLICATIONS

The subject application claims priority to Chinese Patent Application No. 202110858909.0 filed on Jul. 28, 2021, in China. The Chinese priority application is incorporated herein by reference.

TECHNICAL FIELD

The present invention relates to rubber protective wax, particularly, rubber protective wax, its preparation method and application.

BACKGROUND ART

In the process of processing, storage, and use of rubber articles, due to the effects of light, heat, oxygen, ozone, and other factors, aging occurs, resulting in gradual deterioration of performance and eventual loss of use value. Therefore, it is usually necessary to add a protective system to the rubber formulation. As a physical antidegradant, rubber protective wax is an important component in the rubber formulation. Generally, rubber protective wax continually migrates from the inside of the rubber to the surface of the rubber to form a wax film to isolate the contact between the ozone in the atmosphere and the rubber, thereby reducing the degree of aging and extending the service life.

In the case when a paraffin with a large content of n-alkanes is added to rubber, as the molecular structure is linear, the migration resistance is small, and the migration speed is fast, the wax film formed has a loose structure and poor adhesion and is easy to fall off. In the case when a microcrystalline wax with a high content of isoalkanes is added to rubber, the wax film formed by migration has a dense structure, good toughness, and strong adhesion, but the migration speed is slow, because the microcrystalline wax has relatively more branched chains. Therefore, commonly used rubber protective waxes are made of paraffins and microcrystalline waxes in a certain proportion.

Chinese Patent CN1147540C discloses a rubber protective wax, which is made of low melting point paraffin, high melting point paraffin, microcrystalline wax, and polyethylene wax. Chinese Patent CN103254480B discloses a rubber protective wax, which is made of fully refined paraffin, semi-refined paraffin, microcrystalline wax, and ethylene vinyl acetate copolymer. Chinese Patent CN107868479A discloses a rubber protective wax, which is made of fully refined paraffin, microcrystalline wax, linear polyethylene, and Fischer-Tropsch wax. Chinese Patent CN109486420A discloses a rubber protective wax, which is made of modified microcrystalline wax, synthetic wax, polybutene resin, petroleum resin, an epoxy based mineral oil, nano silver chloride, silica bentonite, and auxiliary agents. The protective waxes prepared in the above mentioned art are mainly designed for use in different temperatures or expanding the protective temperature range. The characterization for these protective waxes only involves static ozone protection. The above mentioned references lack tests under dynamic conditions and cannot well reflect the actual application of protective wax in rubber articles.

The existing rubber protective wax can play a certain ozone protection effect under static conditions, but in the case when it is applied in a dynamic load environment, the dynamic protection effect is not good. Therefore, the protection effect of the existing rubber protective wax still needs to be improved. There is a need in the art for a rubber protective wax that has good protection effects in both static environment and dynamic load environment.

SUMMARY OF INVENTION

To solve the problem, the present invention provides a rubber protective wax, which comprises hydrocarbon compounds, a polyethylene wax, and an antidegradant. The rubber protective wax of the present invention renders a rubber good thermal oxidative aging resistance, static ozone aging resistance, dynamic ozone aging resistance, flex cracking resistance, and tensile fatigue resistance, and has good protection effects in both static environment and dynamic load environment.

Specifically, the present invention provides a rubber protective wax, which comprises hydrocarbon compounds, a polyethylene wax, and an antidegradant, wherein based on the total mass of the rubber protective wax, the mass fraction of the hydrocarbon compounds is 55% to 94%, the mass fraction of the polyethylene wax is 1% to 10%, and the mass fraction of the antidegradant is 5% to 35%.

In one or more embodiments of the present invention, based on the total mass of the hydrocarbon compounds, the mass fraction of n-alkanes in the hydrocarbon compounds is 50% to 65%, and preferably 52% to 63%.

In one or more embodiments of the present invention, based on the total mass of the hydrocarbon compounds, the mass fraction of C20-C34 hydrocarbon compounds in the hydrocarbon compounds is 45% to 60%, and preferably 46% to 57%.

In one or more embodiments of the present invention, based on the total mass of the hydrocarbon compounds, the mass fraction of C35-C45 hydrocarbon compounds in the hydrocarbon compounds is 10% to 25%, and preferably 12% to 22%.

In one or more embodiments of the present invention, based on the total mass of the hydrocarbon compounds, the mass fraction of C45+ hydrocarbon compounds in the hydrocarbon compounds is 20% to 40%, and preferably 21% to 36%.

In one or more embodiments of the present invention, the raw materials of the rubber protective wax comprise a paraffin, a microcrystalline wax, a polyethylene wax, and an antidegradant, wherein based on the total mass of the rubber protective wax, the mass fraction of the paraffin is 40% to 70%, the mass fraction of the microcrystalline wax is 15% to 25%, the mass fraction of the polyethylene wax is 1% to 10%, and the mass fraction of the antidegradant is 5% to 35%.

In one or more embodiments of the present invention, the paraffin comprises two or three selected from a paraffin with a melting point of ≥45° C. and <56° C., a paraffin with a melting point of ≥56° C. and <64° C., and a paraffin with a melting point of ≥64° C. and <66° C., and preferably, comprises all three of them. The paraffin with the melting point of ≥45° C. and <56° C. is preferably a paraffin with a melting point of ≥52° C. and <56° C., and more preferably a paraffin with a melting point of ≥52° C. and <54° C. The paraffin with the melting point of ≥56° C. and <64° C. is preferably a paraffin with a melting point of ≥62° C. and <64° C.

In one or more embodiments of the present invention, the microcrystalline wax has a melting point of 60° C. to 90° C., preferably 70° C. to 85° C.; the microcrystalline wax preferably comprises one or two selected from a microcrystalline wax with a melting point of ≥70° C. and <77° C. and a microcrystalline wax with a melting point of ≥77° C. and ≤85° C., and more preferably comprises both. The microcrystalline wax with the melting point of ≥70° C. and <77° C. is preferably a microcrystalline wax with a melting point of ≥72° C. and <77° C.; and the microcrystalline wax with the melting point of ≥77° C. and <85° C. is preferably a microcrystalline wax with a melting point of ≥77° C. and <82° C.

In one or more embodiments of the present invention, the melting point of the polyethylene wax is 100° C. to 120° C., and preferably 105° C. to 115° C.

In one or more embodiments of the present invention, the antidegradant is selected from one or more of an amine antidegradant, a phenolic antidegradant, and a quinoline antidegradant.

In one or more embodiments of the present invention, the melting point of the antidegradant is ≤120° C.

In one or more embodiments of the present invention, the antidegradant is selected from one or two of a amine antidegradant and a quinoline antidegradant, and preferably an amine antidegradant, such as antidegradant 77PD.

In one or more embodiments of the present invention, based on the total mass of the rubber protective wax, the mass fraction of the paraffin in the raw material of the rubber protective wax is 45% to 66%, and preferably 45% to 60%.

In one or more embodiments of the present invention, based on the total mass of the rubber protective wax, the mass fraction of the microcrystalline wax in the raw material of the rubber protective wax is 17% to 24%.

In one or more embodiments of the present invention, based on the total mass of the rubber protective wax, the mass fraction of the polyethylene wax in the raw material of the rubber protective wax is 2% to 8%, and preferably 2% to 5%.

In one or more embodiments of the present invention, based on the total mass of the rubber protective wax, the mass fraction of the antidegradant in the raw material of the rubber protective wax is 6% to 35%, and preferably 15% to 35%.

The present invention also provides a rubber protective wax, the raw materials of which comprise a paraffin, a microcrystalline wax, a polyethylene wax, and an antidegradant, wherein based on the total mass of the rubber protective wax, the mass fraction of the paraffin is 40% to 70%, the mass fraction of the microcrystalline wax is 15% to 25%, the mass fraction of the polyethylene wax is 1% to 10%, and the mass fraction of the antidegradant is 5% to 35%.

In one or more embodiments of the present invention, composition and raw materials of the rubber protective wax are as described in any of the embodiments herein.

In one or more embodiments of the present invention, the mass fraction of n-alkanes is 50% to 65%, and preferably 52% to 63%, based on the total mass of the hydrocarbon compounds contained in the rubber protective wax.

In one or more embodiments of the present invention, the mass fraction of C20-C34 hydrocarbon compounds is 45% to 60%, and preferably 46% to 57%, based on the total mass of the hydrocarbon compounds contained in the rubber protective wax.

In one or more embodiments of the present invention, the mass fraction of C35-C45 hydrocarbon compounds is 10% to 25%, and preferably 12% to 22%, based on the total mass of the hydrocarbon compounds contained in the rubber protective wax.

In one or more embodiments of the present invention, the mass fraction of C45+ hydrocarbon compounds is 20% to 40%, and preferably 21% to 36%, based on the total mass of the hydrocarbon compounds contained in the rubber protective wax.

The present invention also provides a method for preparing the rubber protective wax as described herein, comprising the following steps:
 (1) heating the microcrystalline wax to 90° C. to 110° C. and stirring well;
 (2) adding the paraffin to the material obtained from step (1) and stirring well;
 (3) heating the material obtained by step (2) to 130° C. to 140° C., adding the polyethylene wax and the antidegradant, and stirring well.

In one or more embodiments of the present invention, step (1) comprises stirring for 30 to 50 minutes at a speed of 130 r/min to 150 r/min after the microcrystalline wax is completely melted.

In one or more embodiments of the present invention, step (2) comprises stirring for 40 minutes to 60 minutes at a speed of 160 r/min to 150 r/min after the paraffin is added.

In one or more embodiments, step (3) comprises stirring for 40 min to 90 min at a speed of 200 r/min to 250 r/min after the polyethylene wax and the antidegradant are added.

The present invention also provides a formulation for rubber composition comprising the rubber protective wax as described herein. The formulation for the rubber composition of the present invention comprises a mixture of components that are generally referred to as the raw materials. Based on the formulation of the present invention, one of skilled in the art may obtain both vulcanized or unvulcanized rubber and further process them into rubber articles.

In one or more embodiments of the present invention, the formulation of the rubber composition comprises 100 parts by weight of a diene elastomer, 30 to 70 parts by weight of an enhanced filler, 0.5 to 5 parts by weight of a rubber protective wax as described in any embodiment herein, and 0.5 to 3 parts by weight of a crosslinker.

The present invention also provides a rubber article comprising the rubber composition as described herein. The present invention also provides a rubber composition prepared from the formulation for the rubber composition according to the embodiments as described herein. The rubber composition may be vulcanized or unvulcanized.

The present invention also provides a method for using the rubber protective wax as described herein to improve thermal oxidative aging resistance, static ozone aging resistance, dynamic ozone aging resistance, flex cracking resistance, and/or tensile fatigue performance of a rubber composition or a rubber article.

DETAILED DESCRIPTION

In the present invention, all features, such as numerical values, quantities, amounts and concentrations, which are defined by numerical ranges or percentage ranges, are only for the sake of simplicity and convenience. Accordingly, the recitation of numerical ranges or percentage ranges shall be construed as covering and specifically disclosing all possible sub-ranges and individual values (including integers and fractions) in the range.

In the present invention, when embodiments or examples are described, it should be understood that they are not intended to limit the invention to these embodiments or examples. On the contrary, all alternatives, improvements and equivalents of the methods and materials described in the present invention can be covered within the scope defined by the claims.

In the present invention, the sum of the percentages of component contents is equal to 100%.

In the present invention, unless otherwise specified, a percentage is a mass percentage, and a percentage content is a mass percentage content.

Herein, for the sake of brevity of description, all possible combinations of various technical features in the various embodiments or examples are not described. Therefore, as long as there is no contradiction in the combination of these technical features, the various technical features in the various embodiments or examples can be combined in any combination, and all possible combinations should be considered to be within the scope of the disclosure.

Generally, as a physical antidegradant, conventional rubber protective wax forms a wax film through precipitation to isolate the contact between the rubber and ozone. Under static conditions, the wax film can prevent ozone from entering the rubber and play a role in ozone protection. However, when the protective wax migrates to the rubber surface, in the case that the precipitation is not uniform, it may locally precipitate too much and the wax film formed therefrom tends to agglomerate, which has poor adhesion to the rubber surface and is easy to produce fragments, resulting in insufficient protection of certain parts of the rubber. Especially under dynamic conditions, due to the periodic reciprocating force, the wax film is easy to fall off and lose its protection effect. Therefore, when it is used in a dynamic load environment, the protective time of the rubber protective wax is greatly shortened, and the protection effect is greatly reduced.

The present invention finds that adding an antidegradant to the rubber protective wax significantly improves the dynamic protection effect of the rubber protective wax so that the rubber protective wax has good protection effect when used in a dynamic load environment, and it can also make up for the lack of static protection of certain parts of the rubber, improve the static protection effect of the rubber protection wax, and achieve good combination of static protection and dynamic protection.

The raw materials of the rubber protective wax of the present invention comprise a paraffin, a microcrystalline wax, a polyethylene wax, and an antidegradant, wherein based on the total mass of the rubber protective wax, the mass fraction of the paraffin is 40% to 70%, the mass fraction of the microcrystalline wax is 15% to 25%, the mass fraction of the polyethylene wax is 1% to 10%, and the mass fraction of the antidegradant is 5% to 35%.

The antidegradant suitable for the present invention may be one or more of phenol antidegradants, amine antidegradants, and quinoline antidegradants. Examples of phenolic antidegradants include 2,2'-methylene-bis(4-methyl-6-tert-butylphenol) (antidegradant 2246), 2,2'-thiobis(4-methyl-6-tert-butylphenol) (antidegradant 2246-S), etc. Examples of amine antidegradants include N,N'-bis(1,4-dimethylpentyl) p-phenylenediamine (antidegradant 77PD), N-(1,4-dimethylpentyl)-N'-phenyl-p-phenylenediamine (antidegradant 7PPD), N-(1,3-dimethylbutyl)-N'-phenyl-p-phenylenediamine (antidegradant 6PPD), etc. Examples of quinoline antidegradants include polymer of 2,2,4-trimethyl-1,2-dihydroquinoline (antidegradant TMQ), polymer of 2,2,4-trimethyl-1,2-dihydroquinoline with a total amount of dimer and trimer≥70% (antidegradant S-TMQ), etc. The melting point of the antidegradant is preferably no more than 120° C., which is benefit to the uniform mixing of the antidegradant and the wax in molten state.

In a preferred embodiment, the antidegradant used in the present invention is an amine antidegradant, such as antidegradant 77PD.

The present invention discloses that the rubber protective wax containing an amine antidegradant (e.g., antidegradant 77PD) can render the rubber excellent dynamic and static protection effects, such as significantly improved flexural cracking resistance. Antidegradant 77PD is a liquid antidegradant, so it is easy to mix with molten wax during preparation, and the mixing is more uniform.

Based on the total mass of the rubber protective wax of the present invention, the mass fraction of the antidegradant may be 5% to 35%, such as 6% to 35%, 6% to 33%, 8% to 31%. The mass fraction of the antidegradant is preferably 15% to 35%, such as 15% to 33%, 17% to 31%. The rubber protective wax with high antidegradant content is beneficial to provide good dynamic ozone-resistant protection effects, flex cracking resistance, and tensile fatigue resistance.

The rubber protective wax of the present invention preferably comprises a certain proportion of a paraffin and a microcrystalline so that the composition of hydrocarbon compounds in the rubber protective wax satisfies a certain n-alkane content and a certain carbon number distribution, which is beneficial to obtain a good balance between the migration speed and the density, toughness, and adhesion of the wax film.

Paraffin is a mixture of hydrocarbons, the main component of which is straight-chain alkanes (i.e., n-alkanes), and also contains a small amount of individual branched alkanes and single-ring cycloalkanes with long side chains. The melting point of paraffin is between 45° C. to 65° C. The straight-chain alkane content of paraffin is >50%.

Microcrystalline wax is a mixture of hydrocarbons, the main component of which is branched alkanes, and microcrystalline wax also contains a small amount of cyclic hydrocarbons and straight chain hydrocarbons. The melting point of microcrystalline wax is between 60° C. to 90° C. The branched alkane content of microcrystalline wax is >50%.

Based on the total mass of the hydrocarbon compounds contained in the rubber protective wax of the present invention, the composition of the hydrocarbon compounds in the rubber protective wax of the present invention preferably satisfies:

the mass fraction of C20-C34 hydrocarbon compounds is 45% to 60%, preferably 46% to 57%, such as 46% to 55%, 48%, and 51%;

the mass fraction of C35-C45 hydrocarbon compounds is 10% to 25%, preferably 12% to 22%, such as 14% to 20%, 16%, and 18%; and the mass fraction of C45+ hydrocarbon compounds is 20% to 40%, preferably 21% to 36%, such as 23% to 36%, 29%, and 34%.

When the composition of the hydrocarbon compounds in the rubber protective wax meets the above carbon number distribution, the rubber protective wax of present invention provides a wide protective temperature range. At different temperatures, the rubber protective wax has the corresponding hydrocarbon carbon atoms with maximum migration rate. C20-C45 hydrocarbon compounds have the largest migration rate in the usual temperature range of 10° C. to 40° C. They can quickly migrate to the surface of the vulcanized rubber, form a wax film to provide ozone protection, and meet the protection requirements of the usual temperature range.

In the present invention, C20-C34 hydrocarbon compounds refer to hydrocarbon compounds with a total of 20 to 34 carbon atoms, C35-45 hydrocarbon compounds refer to hydrocarbon compounds with a total of 35 to 45 carbon atoms, and C45+ hydrocarbon compounds refer to hydrocarbon compounds with a total of 45 or more carbon atoms. In the present invention, hydrocarbon compounds refer to hydrocarbons with a molecular weight of no more than 1000, excluding polyethylene wax components.

Based on the total mass of the hydrocarbon compounds contained in the rubber protective wax of the present invention, the composition of the hydrocarbon compounds in the rubber protective wax of the present invention preferably satisfies: the mass fraction of n-alkanes is 50% to 65%, such as 54% to 61%, 55%, and 58%.

When the composition of the hydrocarbon compound in the rubber protective wax satisfies the above n-alkane content and carbon number distribution, the rubber protective wax has a good balance between migration speed and wax film density, toughness, and adhesion.

The aforementioned n-paraffin content and carbon number distribution can be satisfied by making the rubber protective wax that comprises a certain proportion of a paraffin and a microcrystalline wax. For example, in order to make the composition of the hydrocarbon compounds in the rubber protective wax meeting the aforementioned n-alkane content and carbon number distribution, based on the total mass of the rubber protective wax of the present invention, the mass fraction of the paraffin may be 40% to 70%, such as 45% to 66%, 47% to 64%, and 57%, and the mass fraction of the microcrystalline wax may be 15% to 25%, such as 17% to 24%, 19% to 22%, and 21%. In the embodiment where the rubber protective wax comprises a high content (for example, 15% to 35%) of an antidegradant, the mass fraction of the paraffin is preferably 45% to 60%, for example, 47% to 57%.

Paraffins suitable for the present invention may be one or more selected from No. 52 paraffin, No. 54 paraffin, No. 56 paraffin, No. 58 paraffin, No. 60 paraffin, No. 62 paraffin, and No. 64 paraffin. In the present invention, the grade (number) of the paraffin is classified based on the melting point (every 2° C.) according to the standard "GB/T 446-2010 Fully Refined Paraffin Wax," which is incorporated herein by reference. For example, No. 52 paraffin represents a paraffin with a melting point≥52° C. and <54° C., No. 54 paraffin represents a paraffin with a melting point of ≥54° C. and <56° C., and so on. Preferably, the paraffin is selected so that after being combined with the microcrystalline wax, the composition of the hydrocarbon compounds in the rubber protective wax can satisfy the above-mentioned n-alkane content and carbon number distribution. In order to achieve the purpose, the paraffin can comprise two or three of paraffin A, paraffin B, and paraffin C, preferably three of them, wherein the melting point of paraffin A is ≥45° C. and <56° C., preferably ≥52° C. and <56° C., such as ≥52° C. and <54° C.; the melting point of paraffin B is ≥56° C. and <64° C., preferably ≥62° C. and <64° C.; and the melting point of paraffin C is ≥64° C. and <66° C. An example of paraffin A is No. 52 paraffin. An example of paraffin B is No. 62 paraffin. An example of paraffin C is No. 64 paraffin. The mass ratio of any two of paraffin A, paraffin B, and paraffin C can be from 1:3 to 3:1. In some embodiments, the paraffin comprises paraffin B and one or two selected from paraffin A and paraffin C. In some embodiments, the paraffin comprises paraffin B and paraffin C, and the mass ratio of paraffin B and paraffin C is preferably from 1:1 to 1:1.2. In some embodiments, the paraffin comprises paraffin A and paraffin B, and the mass ratio of paraffin A and paraffin B is preferably from 1:2 to 1:2.5. In the present invention, the paraffin is preferably a fully refined paraffin. In the present invention, the fully refined paraffin is a paraffin with an oil amount of ≤0.8%.

The paraffin suitable for the present invention may be one or more selected from No. 70 microcrystalline wax, No. 75 microcrystalline wax, No. 80 microcrystalline wax, and No. 85 microcrystalline wax. In the present invention, the grade (number) of the microcrystalline wax is classified based on melting point (every 5° C.) according to the standard "SH/T 0013-2008 Microcrystalline Wax," which is incorporated herein by reference. For example, No. 70 microcrystalline wax represents a microcrystalline wax with a melting point≥67° C. and <72° C., No. 75 microcrystalline wax represents a microcrystalline wax with a melting point of ≥72° C. and <77° C., and so on. Preferably, the selection of the microcrystalline wax makes that after being matched with the paraffin the composition of the hydrocarbon compounds in the rubber protective wax meets the above-mentioned n-alkane content and carbon number distribution. In order to achieve the goal, the melting point of the microcrystalline wax is preferably 60° C. to 90° C., e.g., 70° C. to 85° C. For example, the microcrystalline wax may comprise one or two of microcrystalline wax A and microcrystalline wax B, preferably both, wherein the melting point of microcrystalline wax A is ≥70° C. and <77° C., and preferably ≥72° C. and <77° C.; and the melting point of microcrystalline wax B is ≥77° C. and ≤85° C., and preferably ≥77° C. and <82° C. Examples of microcrystalline wax A include No. 75 microcrystalline wax. Examples of microcrystalline wax B include No. 80 microcrystalline wax. When the microcrystalline wax comprises microcrystalline wax A and microcrystalline wax B, the mass ratio of microcrystalline wax A and microcrystalline wax B may be from 2:1 to 1:2, e.g. from 1:1 to 1:2.

The rubber protective wax of the present invention also comprises a polyethylene wax (PE wax). The polyethylene wax is a low molecular weight polyethylene. The average molecular weight of the polyethylene wax is usually between 1500 and 5000. The melting point of the polyethylene wax is usually between 90° C. to 120° C. Based on the total mass of the rubber protective wax of the present invention, the mass fraction of the polyethylene wax may be 1% to 10%, such as 2% to 8%, 3% to 7%, and 4%. In the embodiments of the rubber protective wax containing a high content (such as 15% to 35%) of an antidegradant, the mass fraction of the polyethylene wax is preferably 2% to 5%, e.g., 3% to 4%. In some embodiments, the melting point of the polyethylene wax used in the present invention is 100° C. to 120° C., e.g., 110±5° C.

As the main components of paraffin and microcrystalline wax are hydrocarbon compounds, the components of the rubber protective waxes of the present invention are mainly the hydrocarbon compounds, the polyethylene wax, and the antidegradant. The amount of the hydrocarbon compounds in the rubber protective wax of the present invention is the total amount of paraffin and microcrystalline wax. In some embodiments, based on the total mass of the rubber protective wax, in the rubber protective wax of the present invention the mass fraction of the hydrocarbon compounds is 55% to 94%, e.g., 62% to 90% and 62% to 84%, the mass fraction of the polyethylene wax is 1% to 10%, e.g., 2% and 8% and 2% to 5%, and the mass fraction of the antidegradant is 5% to 35%, e.g., 6% to 35% and 15% to 35%. The composition of the hydrocarbon compounds preferably satisfies the above-mentioned n-alkane content and carbon number distribution.

The rubber protective wax of the present invention may be made by mixing the paraffin, the microcrystalline wax, the polyethylene wax, and the antidegradant evenly.

In some embodiments, the rubber protective wax of the present invention is prepared by mixing the paraffin with the microcrystalline wax and then mixing with the polyethylene wax and the antidegradant.

In some embodiments, the rubber protective wax of the present invention is prepared using a method comprising the following steps:
(1) heating the microcrystalline wax to 90° C. to 110° C. and stirring well;
(2) adding the paraffin to the material obtained from step (1) and stirring well;
(3) heating the material obtained by step (2) to 130° C. to 140° C., adding the polyethylene wax and the antidegradant, and stirring well.

The mixture temperature adopted in the present invention is above the melting point of the raw material wax, which is conducive to melting as soon as possible and rapid and full mixing with high efficiency.

In step (1), preferably after completely melted, the microcrystalline wax is stirred for 30 to 50 minutes at a stirring speed of 130 r/min to 150 r/min, so that the components in the microcrystalline wax may be mixed evenly. In step (2), the paraffin is added to the microcrystalline wax at 90° C. to 110° C., and then preferably the mixture is stirred for 40 to 60 minutes at a stirring speed of 160 r/min to 200 r/min, so that the components in the material can be mixed evenly. In step (3), after the polyethylene wax and the antidegradant are added, the material is preferably stirred for 40 to 90 minutes at a stirring speed of 200 r/min to 250 r/min, so that the components in the material can be mixed evenly. After the paraffin, the microcrystalline wax, the polyethylene wax and the antidegradant are evenly mixed, the mixture is filtered and cooled to obtain the rubber protective wax of the present invention.

In some embodiments, the rubber protective wax of the present invention is prepared by the following method: heating the microcrystalline wax to 90° C. to 110° C., and after the microcrystalline wax is completely melted, stirring it for 30-50 minutes at a speed of 130 r/min to 150 r/min; then adding the paraffin and stirring for 40 to 60 minutes at a speed of 160 r/min to 200 r/min; then heating up to 130° C. to 140° C., adding the polyethylene wax and the antidegradant, and stirring for 40 to 90 minutes at a speed of 200 r/min to 250 r/min; then filtering and cooling down to get the rubber protective wax.

Adding the rubber protective wax of the present invention to a rubber composition improves thermal oxidative aging resistance, static ozone aging resistance, dynamic ozone aging resistance, flex cracking resistance, and stretch fatigue resistance of the rubber composition. Therefore, the present invention also provides a rubber composition comprising the rubber protective wax of the present invention.

The formulation for rubber compositions usually comprises a diene elastomer, a reinforcing filler, an antidegradant, and a crosslinker. The rubber protective wax of the invention is used as an antidegradant component of the rubber composition. In the present invention, rubber compositions include unvulcanized rubber and vulcanized rubber. Unvulcanized rubber can be made of from vulcanized rubber by vulcanization (curing).

Based on 100 parts by weight of the diene elastomer, in the formulation for the rubber composition of the present invention, the amount of the enhanced filler is 30 to 70 parts by weight, the amount of the antidegradant is 0.1 to 8 parts by weight, and the amount of the crosslinker is 0.5 to 3 parts by weight. Herein, unless otherwise specified, part by weight is based on 100 parts by weight of the diene elastomer in the formulation of the rubber composition.

Herein, a diene elastomer refers to an elastomer with its monomers comprising a diene (such as butadiene and isoprene). Diene elastomers suitable for the present invention are known in the field, including but not limited to, one or more selected from natural rubber (NR), butadiene rubber (BR), isoprene rubber, styrene butadiene rubber (SBR), chloroprene rubber (CR), nitrile butadiene rubber (NBR), isoprene/butadiene copolymer, isoprene/styrene copolymer, and isoprene/butadiene/styrene copolymer. In some embodiments, in the formulation for the rubber composition of the present invention, the diene elastomer comprises natural rubber and butadiene rubber, or consists of natural rubber and butadiene rubber. The mass ratio of the natural rubber to the butadiene rubber may be in the ranges of from 1:9 to 9:1, from 2:8 to 8:2, from 3:7 to 7:3, from 4:6 to 6:4, from 4.5:5.5 to 5.5:4.5, or 1:1. Examples of natural rubbers include the first grade standard rubber in the Chinese national standard GB/T 8081-2008 (generally referred to as SCR5). Examples of butadiene rubbers include a butadine rubber confirming to the Chinese national standard GB/T 8659-2018 (generally referred to as BR9000). Both national standards are incorporated herein by reference.

The formulation for the rubber composition usually comprises 0.1 to 8 parts by weight, e.g., 0.5 to 5 parts by weight of antidegradant. The rubber composition of the present invention is characterized in that the antidegradant in it comprises the rubber protective wax of the present invention. In the rubber composition, the amount of the rubber protective wax of the present invention may be 0.5 to 5 parts by weight, e.g., 1 to 3 parts by weight, 2±0.5 parts by weight. Using a small amount of the rubber protective wax of the present invention renders the rubber composition excellent thermal oxidative aging resistance, static ozone aging resistance, dynamic ozone aging resistance, flex cracking resistance and stretch fatigue resistance. The rubber composition may further comprise other antidegradants if needed.

Reinforcing fillers suitable for use in the present invention may be those conventionally used for rubber compositions, including but not limited to, one or more selected from carbon black, titanium oxide, magnesium oxide, calcium carbonate, magnesium carbonate, aluminum hydroxide, magnesium hydroxide, clay, and talc. In some embodiments, in the rubber composition of the present invention, the reinforcing filler is carbon black. Generally, the formulation for the rubber composition comprises 30 to 70 parts by weight, preferably 40 to 60 parts by weight, and more preferably 45 to 55 parts by weight, of a reinforcing filler. In some embodiment, the formulation for the rubber composition of the present invention comprises 30 to 70 parts by weight, preferably 40 to 60 parts by weight, and more preferably 45 to 55 parts by weight.

A crosslinker may be sulfur (S). Generally, the formulation of the rubber composition comprises 0.5 to 3 parts by weight, preferably 1 to 3 parts by weight, more preferably 1 to 2 parts by weight of a crosslinker. In some embodiment, the formulation of the rubber composition of the present invention comprises 0.5 to 3 parts by weight, preferably 1 to 3 parts by weight, more preferably 1 to 2 parts by weight, such as 1.5±0.2 parts by weight or 1.5±0.1 parts by weight of sulfur.

The formulation for the rubber composition of the present invention may also comprise other components conventionally used in the rubber composition, including but not limited to, one or more of aids and promoters. The amounts of aids and promoters may be conventional amounts in the art.

Aids may include softeners used to improve processability and other properties. Softeners may include petroleum softeners (i.e., operating oil), such as naphthenic oil, aromatic oil, processing oil, lubricating oil, paraffin, liquid paraffin, petroleum asphalt, and vaseline, etc., and/or fatty oil softeners, such as stearic acid, castor oil, flaxseed oil, rapeseed oil, coconut oil, wax (e.g., beewax, carnauba wax, and lanolin), tall oil, linoleic acid, palmitic acid, and lauric acid, etc. Aids may also include activators, such as zinc oxide, which can speed up the vulcanization rate and improve the thermal conductivity, wear resistance, and tear resistance of rubber. Generally, aids are used in the amount of 2 to 20 parts by weight per 100 parts by weight of diene elastomer. In some embodiments, the formulation of the rubber composition of the present invention comprises operating oil, such as aromatic oil. The formulation of the rubber composition of the present invention may comprise 0 to 20 parts by weight, preferably 1 to 10 parts by weight, more preferably 2 to 8 parts by weight, such as 5±2 parts by weight or 5±1 parts by weight of operating oil, such as aromatic oil. In some embodiments, the formulation of the rubber composition of the present invention comprises a fatty oil softener, such as stearic acid. The formulation of the rubber composition of the present invention may comprise 0 to 5 parts by weight, preferably 0.5 to 4 parts by weight, more preferably 1 to 3 parts by weight, such as 2±0.5 parts by weight or 2±0.2 parts by weight, of a fatty oil softener, such as stearic acid. In some embodiments, the formulation of the rubber composition of the present invention comprises an activator, such as zinc oxide. The formulation of the rubber composition of the present invention may comprise 0 to 10 parts by weight, preferably 2 to 8 parts by weight, more preferably 3 to 7 parts by weight, such as 5±1 parts by weight, of an activator, such as zinc oxide. In some embodiments, the formulation of the rubber composition of the present invention comprises operating oil, a fatty oil softener, and an activator. The amounts of the operating oil, the fatty oil softener, and the activator are as described above, respectively.

Promoters are generally vulcanization accelerators, which may be selected from one or more of sulfonamide, thiazole, thiuram, thiourea, guanidine, dithiocarbamate, aldimine, aldehyde ammonia, imidazoline, and xanthic acid vulcanization accelerators. For example, the promoter may be N-tert-butylbenzothiazole-2-sulphenamide (NS). In some embodiments, the formulation of the rubber composition of the present invention comprises a promoter, such as NS. The formulation of the rubber composition of the present invention may comprise 0 to 1.5 parts by weight, preferably 0.5 to 1.5 parts by weight, more preferably 0.5 to 1.2 parts by weight, such as 0.8±0.2 parts by weight or 0.8±0.1 parts by weight, of a promoter, such as NS.

In addition, when necessary, a plasticizer may be used in the rubber composition of the present invention, which includes, but not limited to, dimethyl phthalate (DMP), diethyl phthalate (DEP), dibutyl phthalate (DBP), diheptyl phthalate (DHP), dioctyl phthalate (DOP), di-isononyl phthalate (DINP), di-isodecyl phthalate (DIDP), butyl benzyl phthalate (BBP), dilauryl phthalate (DWP), and dicyclohexyl phthalate (DCHP), etc. The plasticizer may be used in a conventional amount that is known in the art.

In some preferred embodiments, the formulation of the rubber composition of the present invention comprises 100 parts by weight of a diene elastomer; 40 to 60 parts by weight, preferably 45-55 parts by weight of a reinforcing filler, 1 to 3 parts by weight, preferably 1 to 2 parts by weight of sulfur, 0.5 to 5 parts by weight, preferably 1 to 3 parts by weight, more preferably 2±0.5 parts by weight of an antidegradant, 2 to 8 parts by weight, preferably 3 to 7 parts by weight of an activator, 0.5 to 4 parts by weight, preferably 1 to 3 parts by weight of a fatty oil softener, 1 to 10 parts by weight, preferably 2 to 8 parts by weight of an operating oil and 0.5 to 1.5 parts by weight, preferably 0.5 to 1.2 parts by weight of a promoter; wherein the diene elastomer preferably comprises natural rubber and butadiene rubber with a mass ratio of from 4:6 to 6:4, preferably from 4.5:5.5 to 5.5:4.5; the reinforcing filler is preferably carbon black; the antidegradant comprises the rubber protective wax of the present invention; the activator is preferably zinc oxide; the fatty oil softener is preferably stearic acid; the operating oil is preferably aromatic oil; and the promoter is preferably NS promoter.

The unvulcanized rubber of the present invention may be prepared by conventional rubber mixing method, such as a two-stage mixing method as follows: in the first stage, an internal mixer is used to mix diene elastomers, reinforcing fillers, aids and antidegradants, and the rubber discharge temperature is 110° C. or higher; in the second stage, an open mill is used to mix the rubber obtained in the first stage with crosslinkers and promoters.

Generally, a diene elastomer is added into a thermomechanical mixer, such as an internal mixer at first. After kneading for a while, a reinforcing filler, an aid, and an antidegradant are added to the diene elastomer and the mixture is kept on being kneaded until the mixture is homogeneous. The reinforcing filler, the aid, and the antidegradant may be added in batches. The temperature during kneading is controlled to between 110° C. and 190° C., preferably 150° C. to 160° C. Then, the mixture is cooled to 100° C. or lower. A crosslinker and a promoter are added to the mixture and a second kneading is performed during which the temperature is controlled to 110° C. or lower, e.g. 70±5° C., and an unvulcanized rubber is obtained.

The unvulcanized rubber of the present invention may be vulcanized by a conventional vulcanization method to obtain a vulcanized rubber. The vulcanization temperature is generally 130° C. to 200° C., such as 140° C. to 150° C. or 145±2° C. The vulcanization time depends on the vulcanization temperature, vulcanization system, and vulcanization kinetics, and is generally from 15 minutes to 60 minutes, such as 20 minutes to 40 minutes or 30±5 minutes. Conventional tablet pressing can be carried out on the kneaded unvulcanized rubber before vulcanization.

In some embodiments, the rubber composition of the present invention is prepared by the following method:
(1) Mixing diene elastomers, reinforcing fillers, aids, and antidegradants uniformly with a thermomechanical mixer, such as an internal mixer, preferably with a rubber discharge temperature of 110° C. or higher, for example, more than 140° C.;
(2) Mixing the rubber obtained in step (1), vulcanizing agents, and promoters uniformly with a thermomechanical mixer, such as an open mill, preferably with a tablet discharge temperature of 110° C. or lower, to obtain an unvulcanized rubber.

In some embodiments, the method for preparing the rubber composition of the present invention further comprises:
(3) After optionally pressing the unvulcanized rubber, vulcanizing the unvulcanized rubber to obtain a vulcanized rubber. Preferably, the vulcanization temperature is 130° C. to 200° C., such as 140° C. to 150° C. Preferably, the vulcanization time is 15 minutes to 60 minutes, such as 20 minutes to 40 minutes.

The use of the rubber composition of the present invention in rubber articles, especially rubber tires, may improve the thermal oxidative aging resistance, the static ozone aging resistance, the dynamic ozone aging resistance, the flex cracking resistance, and the stretch fatigue resistance. Therefore, the present invention also provides a rubber articles comprising the rubber composition described herein. The rubber article may be a tire, a rubber overshoe, a sealing strip, an acoustic panel, or a crash pad. In some embodiments, the rubber article is a tire rubber composition, such as tread composition, a belt ply composition, and a sidewall composition of a tire. As a belt ply of a tire, the rubber article may further comprise a reinforcing material conventionally used in the art in addition to the rubber composition of the present invention.

The present invention also provides the use of the rubber protective wax described of the present invention in improving the thermal oxidative aging resistance, static ozone aging resistance, dynamic ozone aging resistance, flex cracking resistance and/or tensile fatigue resistance of a rubber composition or a rubber article.

The present invention is illustrated by way of specific examples below. It should be understood that these examples are merely explanatory and is not intended to limit the scope of the present invention. Unless otherwise specified, the methods, reagents and materials used in the following examples are conventional in the art. The formulations used in the examples are commercially available.

Example 1

Rubber protective wax 1 is prepared according to the formulation in Table 1 with the following method: No. 80 microcrystalline wax is added to a reactor, and heated to 100° C. After totally melted, the microcrystalline wax is stirred for 30 minutes at 150 r/min. Then No. 62 paraffin and No. 64 paraffin are added to the reactor, and the mixture is stirred for 50 minutes at 200 r/min. Then the mixture is heated to 140° C., and PE wax and 77PD are added, and the mixture is stirred for 60 minutes at 250 r/min. Then the melted wax liquid is poured out, filtered, and cooled to get rubber protective wax 1.

Example 2

Rubber protective wax 2 is prepared according to the formulation in Table 1 with the following method: No. 80 microcrystalline wax and No. 75 microcrystalline wax are added to a reactor, and heated to 100° C. After totally melted, the microcrystalline wax is stirred for 40 minutes at 130 r/min. Then No. 52 paraffin and No. 62 paraffin are added to the reactor, and the mixture is stirred for 40 minutes at 160 r/min. Then the mixture is heated to 135° C., and PE wax and 77PD are added, and the mixture is stirred for 50 minutes at 200 r/min. Then the melted wax liquid is poured out, filtered, and cooled to get rubber protective wax 2.

Example 3

Rubber protective wax 3 is prepared according to the formulation in Table 1 with the following method: No. 75 microcrystalline wax is added to a reactor, and heated to 95° C. After totally melted, the microcrystalline wax is stirred for 30 minutes at 140 r/min. Then No. 62 paraffin and No. 64 paraffin are added to the reactor, and the mixture is stirred for 40 minutes at 180 r/min. Then the mixture is heated to 135° C., and PE wax and 77PD are added, and the mixture is stirred for 40 minutes at 200 r/min. Then the melted wax liquid is poured out, filtered, and cooled to get rubber protective wax 3.

Example 4

Rubber protective wax 4 is prepared according to the formulation in Table 1 with the following method: No. 80 microcrystalline wax and No. 75 microcrystalline wax are added to a reactor, and heated to 100° C. After totally melted, the microcrystalline wax is stirred for 40 minutes at 130 r/min. Then No. 52 paraffin and No. 62 paraffin are added to the reactor, and the mixture is stirred for 40 minutes at 160 r/min. Then the mixture is heated to 135° C., and PE wax and TMQ are added, and the mixture is stirred for 50 minutes at 200 r/min. Then the melted wax liquid is poured out, filtered, and cooled to get rubber protective wax 4.

Comparative Example 1

Rubber protective wax 5 is prepared according to the formulation in Table 1 with the following method: No. 80 microcrystalline wax and No. 75 microcrystalline wax are added to a reactor, and heated to 100° C. After totally melted, the microcrystalline wax is stirred for 40 minutes at 130 r/min. Then No. 52 paraffin and No. 62 paraffin are added to the reactor, and the mixture is stirred for 40 minutes at 160 r/min. Then the mixture is heated to 135° C., and PE wax is added, and the mixture is stirred for 50 minutes at 200 r/min. Then the melted wax liquid is poured out, filtered, and cooled to get rubber protective wax 5.

The sources of the components in Table 1 are as follows:
No. 52 paraffin: No. 52 fully refined paraffin, Sinopharm Group;
No. 62 paraffin: No. 62 fully refined paraffin, China National Petroleum Corporation;
No. 64 paraffin: No. 64 fully refined paraffin, China National Petroleum Corporation;
No. 75 microcrystalline wax: China Petrochemical Co., Ltd.;
No. 80 microcrystalline wax: China Petrochemical Co., Ltd.;
PE wax: Henan Yuyang Wax Industry Co., Ltd., melting point of 110° C.;
Antidegradant 77PD: Sennics Co., Ltd;
Antidegradant TMQ: Sennics Co., Ltd.

TABLE 1

Formulation for rubber protective waxes of Examples 1-4 and Comparative Example 1 (Unit: % mass percentage)

| Formulation | Rubber protective wax 1 | Rubber protective wax 2 | Rubber protective wax 3 | Rubber protective wax 4 | Rubber protective wax 5 |
|---|---|---|---|---|---|
| No. 52 parafin | — | 17 | — | 17 | 17 |
| No. 62 parafin | 23 | 40 | 30 | 40 | 40 |
| No. 64 parafin | 24 | — | 34 | — | — |

TABLE 1-continued

Formulation for rubber protective waxes of Examples 1-4 and Comparative Example 1 (Unit: % mass percentage)

| Formulation | Rubber protective wax 1 | Rubber protective wax 2 | Rubber protective wax 3 | Rubber protective wax 4 | Rubber protective wax 5 |
|---|---|---|---|---|---|
| No. 75 micro-crystalline wax | — | 8 | 21 | 8 | 8 |
| No. 80 micro-crystalline wax | 19 | 14 | — | 14 | 14 |
| PE wax | 3 | 4 | 7 | 4 | 4 |
| 77PD | 31 | 17 | 8 | — | — |
| TMQ | — | — | — | 17 | — |

The hydrocarbon compounds in Rubber protective waxes 1-5 were analyzed according to "SH/T 0653-1998 Petroleum waxes—Determination of carbon number distribution of normal paraffin and non-normal paraffin hydrocarbons," and the results are shown in Table 2.

TABLE 2

The n-alkane/non-n-alkane content and carbon number distribution of hydrocarbon compounds in rubber protective waxes 1-5 (Unit: % mass percentage)

| | Rubber protective wax 1 | Rubber protective wax 2 | Rubber protective wax 3 | Rubber protective wax 4 | Rubber protective wax 5 |
|---|---|---|---|---|---|
| N-alkane content | 61 | 54 | 58 | 55 | 54 |
| Non-n-alkane content | 39 | 46 | 42 | 45 | 46 |
| C20-C34 hydrocarbon compound content | 55 | 48 | 51 | 48 | 46 |
| C35-C45 hydrocarbon compound content | 20 | 16 | 18 | 14 | 16 |
| C45+ hydrocarbon compound content | 23 | 34 | 29 | 36 | 36 |

Application Example 1

Vulcanized rubbers 1-8 are prepared according to the tire formulation shown in Table 3 with the preparation method as follows:

1. Natural rubber NR and synthetic rubber BR are added to an internal mixer, and after kneaded for a period of time, carbon black, zinc oxide, stearic acid, aromatic oil, and optional protective wax and antidegradant are added, wherein vulcanized rubbers 1-8 are added with rubber protective wax 1, with rubber protective wax 2, with rubber protective wax 3, with protective wax A, with No. 62 paraffin wax, without protective wax, with rubber protective wax 4, with rubber protective wax 5 and with antidegradant 77PD, respectively, and then the mixture is kneaded until the mixture is uniform; the temperature during kneading is controlled between 150° C. and 160° C.;

2. The mixture is cooled to below 100° C., then sulfur S and promoter NS are added, and the entire mixture is kneaded; the temperature during kneading is controlled to no more than 110° C.;

3. The rubber composition obtained in step 2 is pressed into a film with a thickness of 2 mm and vulcanized at a vulcanization temperature of 145° C. for 30 minutes to obtain a vulcanized rubber.

The sources of the components in Table 3 are as follows:

NR: natural rubber SCR5, Xishuangbanna Sinochem Rubber Co., Ltd.;

BR: synthetic rubber BR9000, Nanjing Yangzi Petrochemical Rubber Co., Ltd.

Carbon black: carbon Black N550, Cabot Corporation;

Zinc oxide: general reagent zinc oxide (AR), Shanghai Titan Scientific Co., Ltd.

Stearic acid: general reagent stearic acid (AR), Shanghai Titan Scientific Co., Ltd.

Aromatic oil: general reagent, Shanghai Titan Naphthenic Co., Ltd.;

S: sublimed sulfur (AR), Sinopharm Chemical Reagent Company;

NS: vulcanization accelerator NS, Sennics Co., Ltd.,

Protective wax A: rubber protective wax Okerin 1987, Paramelt Specialty Materials Co., Ltd.;

No. 62 Paraffin: No. 62 fully refined paraffin, China National Petroleum Corporation;

Antidegradant 77PD: Sennics Co., Ltd.

TABLE 3

Formulation of vulcanized rubbers 1-8 (unit: parts by mass)

| Formulation | Vulcanized rubber 1 | Vulcanized rubber 2 | Vulcanized rubber 3 | Vulcanized rubber 4 | Vulcanized rubber 5 | Vulcanized rubber 6 | Vulcanized rubber 7 | Vulcanized rubber 8 |
|---|---|---|---|---|---|---|---|---|
| NR | 50 | 50 | 50 | 50 | 50 | 50 | 50 | 50 |
| BR | 50 | 50 | 50 | 50 | 50 | 50 | 50 | 50 |
| Carbon black | 50 | 50 | 50 | 50 | 50 | 50 | 50 | 50 |
| Zinc oxide | 5 | 5 | 5 | 5 | 5 | 5 | 5 | 5 |
| Stearic acid | 2 | 2 | 2 | 2 | 2 | 2 | 2 | 2 |
| Aromatic oil | 5 | 5 | 5 | 5 | 5 | 5 | 5 | 5 |
| Rubber protective wax 1 | 2 | — | — | — | — | — | — | — |
| Rubber protective wax 2 | — | 2 | — | — | — | — | — | — |

TABLE 3-continued

Formulation of vulcanized rubbers 1-8 (unit: parts by mass)

| Formulation | Vulcanized rubber 1 | Vulcanized rubber 2 | Vulcanized rubber 3 | Vulcanized rubber 4 | Vulcanized rubber 5 | Vulcanized rubber 6 | Vulcanized rubber 7 | Vulcanized rubber 8 |
|---|---|---|---|---|---|---|---|---|
| Rubber protective wax 3 | — | — | 2 | — | — | — | — | — |
| Protective wax A | — | — | — | 2 | — | — | — | — |
| No. 62 Parafin | — | — | — | — | 2 | — | — | — |
| Rubber protective wax 4 | — | — | — | — | — | — | 2 | — |
| Rubber protective wax 5 | — | — | — | — | — | — | — | 1.66 |
| 77PD | — | — | — | — | — | — | — | 0.34 |
| NS | 0.8 | 0.8 | 0.8 | 0.8 | 0.8 | 0.8 | 0.8 | 0.8 |
| S | 1.5 | 1.5 | 1.5 | 1.5 | 1.5 | 1.5 | 1.5 | 1.5 |

Test Example 1: Physical and Mechanical Properties Before and After Aging

Hardness, tensile strength, and elongation at break before aging and rates of change of hardness, tensile strength and elongation at break after aging of vulcanized rubbers 1-8 are measured, wherein the hardness is measured according to GB/T 531.1-2008, the tensile strength and the elongation at break are measured according to GB/T 528-2009, and the aging condition is 100° C.×72 h. The results are shown in Table 4.

TABLE 4

Physical and mechanical properties of vulcanized rubbers 1-8 before and after aging

| | Vulcanized rubber 1 | Vulcanized rubber 2 | Vulcanized rubber 3 | Vulcanized rubber 4 | Vulcanized rubber 5 | Vulcanized rubber 6 | Vulcanized rubber 7 | Vulcanized rubber 8 |
|---|---|---|---|---|---|---|---|---|
| Hardness Shore A | 58 | 58 | 58 | 58 | 58 | 59 | 58 | 58 |
| Tensile strength MPa | 20.5 | 20.4 | 20.4 | 20.2 | 19.9 | 19.5 | 20.4 | 20.3 |
| Elongation at break % | 548 | 561 | 553 | 527 | 530 | 533 | 556 | 540 |
| Change of hardness after aging Shore A | 3 | 3 | 3 | 3 | 3 | 3 | 3 | 3 |
| Change rate of tensile strength after aging % | −15 | −17 | −19 | −21 | −25 | −30 | −15 | −19 |
| Change rate of elongation at break after aging % | −12 | −13 | −15 | −19 | −22 | −31 | −12 | −18 |

It can be seen from Table 4 that the vulcanized rubbers using rubber protective waxes of the present invention (vulcanized rubbers 1-3 and vulcanized rubber 7) have similar physical and mechanical properties before aging compared with other vulcanized rubbers and significantly reduced change rates of tensile strength and elongation at break compared with vulcanized rubber 4 using protective wax A and vulcanized rubber 5 using NO. 62 paraffin.

Vulcanized rubber 8 contains equal amounts of paraffin, microcrystalline wax, PE wax and 77PD with vulcanized rubber 2. The difference between vulcanized rubbers 8 and 2 is that for vulcanized rubber 2, 77PD is dispersed in paraffin, microcrystalline wax and PE wax in advance to form rubber protective wax 2 and then rubber protective wax 2 is added to the rubber compound during the mixing process, while for vulcanized rubber 8, rubber protective wax 5 without 77PD and 77PD are added to the rubber compound during the mixing process. It can be seen from Table 4 that compared with vulcanized rubber 8, the change rate of tensile strength and elongation at break after aging of vulcanized rubber 2 is obviously lower, which shows that compared to adding the antidegradant and the rubber protective wax separately, dispersing the antidegradant in the rubber protective wax in advance to form the rubber protective wax of the present invention significantly improves the thermal oxidative aging resistance of the rubber.

Test Example 2: Static Ozone Aging Resistance

Static ozone aging strain test on vulcanized rubbers 1-8 is performed according to GB/T7762-2014 Resistance to ozone cracking—Static strain testing. The ozone aging conditions are: temperature 40° C., pre-stretching 20%, ozone concentration 50 pphm. Grades of crack are evaluated according to GB/T 11206-2009. The results are shown in Table 5. In the results of Table 5, the numbers indicate the grades of crack width, and the letters indicate the grades of crack density. The specific meanings of the grades are shown in Table 6 and Table 7.

It can be seen from Table 5 that the vulcanized rubbers using the rubber protective wax of the present invention (vulcanized rubbers 1-3 and vulcanized rubber 7) have no crack after 96 hours of ozone aging under static conditions, and have good static ozone resistance. In particular, the vulcanized rubbers using the rubber protective wax of the present invention containing 77PD (vulcanized rubbers 1-3) have no crack after 240 hours of ozone aging under static conditions, and have excellent static ozone resistance.

Compared with the vulcanized rubber 5 using No. 62 paraffin wax, the vulcanized rubbers using the rubber protective wax of the present invention (vulcanized rubbers 1-3 and vulcanized rubber 7) have significantly improved static ozone resistance, which shows that adding antidegradant to

TABLE 5

Static ozone aging resistance of vulcanized rubbers 1-8

| Time | Vulcanized rubber 1 | Vulcanized rubber 2 | Vulcanized rubber 3 | Vulcanized rubber 4 | Vulcanized rubber 5 | Vulcanized rubber 6 | Vulcanized rubber 7 | Vulcanized rubber 8 |
|---|---|---|---|---|---|---|---|---|
| 2 h | 0 | 0 | 0 | 0 | 0 | 1b | 0 | 0 |
| 4 h | 0 | 0 | 0 | 0 | 0 | 1b | 0 | 0 |
| 8 h | 0 | 0 | 0 | 0 | 0 | 1c | 0 | 0 |
| 24 h | 0 | 0 | 0 | 0 | 0 | 2c | 0 | 0 |
| 48 h | 0 | 0 | 0 | 0 | 1c | 2c | 0 | 0 |
| 72 h | 0 | 0 | 0 | 0 | 1c | 4c | 0 | 0 |
| 96 h | 0 | 0 | 0 | 0 | 2c | Fractured | 0 | 0 |
| 168 h | 0 | 0 | 0 | 0 | 3c | Fractured | 1c | 0 |
| 240 h | 0 | 0 | 0 | 1b | Fractured | Fractured | 2c | 1b |

TABLE 6

The grade of crack width on the surface of sample

| The grade of crack width | Cracking degree and apparent characteristics | Crack width/mm |
|---|---|---|
| Grade 0 | No crack, still invisible with a 20× magnifying glass | 0 |
| Grade 1 | Slight crack, tiny crack pattern, easy to see with a magnifying glass, and carefully visible to the naked eye | <0.1 |
| Grade 2 | Significant crack, obvious crack pattern, widely developed | <0.2 |
| Grade 3 | Severe crack, large crack pattern, all over the surface, severely deep inside | <0.4 |
| Grade 4 | The most serious crack, deep and large crack pattern, outstretched crack surface, near fracture | ≥0.4 |

TABLE 7

The grade of crack density on the surface of sample

| Grade of crack density | Cracking degree and apparent characteristics | Crack pattern density/ (bar/cm) |
|---|---|---|
| a | Few cracks, sparse crack patterns, easy to count | <10 |
| b | Many cracks, scattered or concentrated crack patterns on the surface, carefully countable | <40 |
| c | Countless cracks, crack patterns densely and fully covering the surface, difficult to count | ≥40 | the rubber protective wax can improve the static protection effect of the rubber protective wax.

The static ozone aging resistance of vulcanized rubber 2 is better than that of vulcanized rubber 8, which shows that compared to adding the antidegradant and the rubber protective wax separately, dispersing the antidegradant in the rubber protective wax in advance to form the rubber protective wax of the present invention improves the static ozone aging resistance of the rubber.

Test Example 3: Dynamic Ozone Aging Resistance

Static ozone aging strain test on vulcanized rubbers 1-8 is performed according to GB/T13642-2015 Resistance to ozone cracking—Dynamic strain testing. The ozone aging conditions are: temperature 40° C., pre-stretching 10%, stretching length 10%, stretching frequency 0.5 Hz, ozone concentration 50 pphm. Grades of crack are evaluated according to GB/T 11206-2009. The results are shown in Table 8. In the results of Table 8, the numbers indicate the grades of crack width, and the letters indicate the grades of crack density. The specific meanings of the grades are shown in Table 6 and Table 7.

TABLE 8

Dynamic ozone aging resistance of vulcanized rubbers 1-8

| Time | Vulcanized rubber 1 | Vulcanized rubber 2 | Vulcanized rubber 3 | Vulcanized rubber 4 | Vulcanized rubber 5 | Vulcanized rubber 6 | Vulcanized rubber 7 | Vulcanized rubber 8 |
|---|---|---|---|---|---|---|---|---|
| 2 h  | 0  | 0  | 0  | 0  | 0  | 1a | 0  | 0  |
| 4 h  | 0  | 0  | 0  | 0  | 1a | 1c | 0  | 0  |
| 8 h  | 0  | 0  | 0  | 1c | 1c | 2c | 0  | 0  |
| 12 h | 0  | 0  | 0  | 1c | 2c | 3c | 0  | 0  |
| 24 h | 1c | 1c | 1c | 2c | 3c | 3c | 1c | 1c |
| 36 h | 1c | 1c | 2c | 2c | 3c | 4c | 2c | 2c |
| 48 h | 2c | 2c | 2c | 3c | 4c | 4c | 3c | 2c |
| 72 h | 2c | 2c | 3c | 3c | 4c | 4c | 3c | 3c |

It can be seen from Table 8 that the vulcanized rubbers added with the rubber protective wax of the present invention (vulcanized rubbers 1-3 and vulcanized rubber 7) have better dynamic ozone aging resistance compared to vulcanized rubbers 4-6.

The dynamic ozone aging resistance of vulcanized rubber 2 is better than that of vulcanized rubber 7, which shows that the rubber protective wax of the present invention containing 77PD has better dynamic ozone aging resistance improvement effect compared to the rubber protective wax of the present invention containing TMQ.

The dynamic ozone aging resistance of vulcanized rubber 2 is better than that of vulcanized rubber 8, which shows that compared to adding the antidegradant and the rubber protective wax separately, dispersing the antidegradant in the rubber protective wax in advance to form the rubber protective wax of the present invention improves the dynamic ozone aging resistance of the rubber.

Test Example 4: Flex Cracking Resistance

Flex cracking test and evaluation of grades of flex cracking resistance of vulcanized rubbers 1-8 are carried out according to GB/T13934-2006. The test frequency is 300 r/min. The results are shown in Table 9, and the grading standards for crack grades 1-6 are as follows:

Grade 1: The cracks look like 'acupuncture points' with naked eyes, and the number of 'acupuncture points' is 10 or less; Grade 2: (a) The number of 'acupuncture points' exceeds 10; or (b) The number of "acupuncture points" is less than 10, but one or more crack points have expanded beyond the scope of the "acupuncture points," that is, the cracks has obvious length and very shallow depth, and the length of the cracks does not exceed 0.5 mm; Grade 3: One or more acupuncture points expand into obvious cracks with obvious length and small depth, and the length of the cracks is greater than 0.5 mm but not greater than 1.0 mm; Grade 4: The length of the largest crack is greater than 1.0 mm, but not greater than 1.5 mm; Grade 5: The length of the largest crack is greater than 1.5 mm, but not greater than 3.0 mm; and Grade 6: The length of the largest crack is greater than 3.0 mm.

TABLE 9

Flex cracking resistance of vulcanized rubbers 1-8

| Number of thousand cycles | Vulcanized rubber 1 | Vulcanized rubber 2 | Vulcanized rubber 3 | Vulcanized rubber 4 | Vulcanized rubber 5 | Vulcanized rubber 6 | Vulcanized rubber 7 | Vulcanized rubber 8 |
|---|---|---|---|---|---|---|---|---|
| 100  | 1 | 1 | 1 | 1 | 1 | 1 | 1 | 1 |
| 200  | 1 | 1 | 1 | 1 | 2 | 1 | 1 | 1 |
| 500  | 1 | 1 | 1 | 1 | 3 | 2 | 1 | 1 |
| 800  | 1 | 1 | 1 | 3 | 5 | 3 | 2 | 2 |
| 1200 | 1 | 1 | 1 | 5 | 6 | 5 | 3 | 3 |
| 1600 | 1 | 2 | 2 | 6 | 6 | 6 | 3 | 4 |
| 2000 | 2 | 2 | 3 | 6 | 6 | 6 | 4 | 4 |

It can be seen from Table 9 that the vulcanized rubbers added with the rubber protective wax of the present invention (vulcanized rubbers 1-3 and vulcanized rubber 7) have better flex cracking resistance compared to vulcanized rubbers 4-6.

The flex cracking resistance of vulcanized rubber 2 is better than that of vulcanized rubber 7, which shows that the rubber protective wax of the present invention containing 77PD has better flex cracking resistance improvement effect than the rubber protective wax of the present invention containing TMQ.

The flex cracking resistance of vulcanized rubber 2 is significantly better than that of vulcanized rubber 8, which shows that compared to adding the antidegradant and the rubber protective wax separately, dispersing the antidegradant in the rubber protective wax in advance to form the rubber protective wax of the present invention significantly improves the flex cracking resistance of the rubber.

Test Example 5: Tensile Fatigue Resistance

Tensile fatigue resistance test of vulcanized rubbers 1-8 is carried out according to GB/T1688-2008, and the results are shown in Table 10.

TABLE 10

Tensile fatigue resistance of vulcanized rubbers 1-8

| | Vulcanized rubber 1 | Vulcanized rubber 2 | Vulcanized rubber 3 | Vulcanized rubber 4 | Vulcanized rubber 5 | Vulcanized rubber 6 | Vulcanized rubber 7 | Vulcanized rubber 8 |
|---|---|---|---|---|---|---|---|---|
| Times at breaking (ten thousand times) | 75 | 70 | 65 | 48 | 47 | 45 | 65 | 68 |

As can be seen from Table 10, compared with vulcanized rubber No. 6 without protective wax, vulcanized rubber 4 added with protective wax A and vulcanized rubber 5 added with paraffin wax show similar tensile fatigue resistance. The tensile fatigue resistance of the vulcanized rubber added with the rubber protective wax of the present invention (vulcanized rubbers 1-3 and vulcanized rubber 7) has been significantly improved compared with that of vulcanized rubber 6.

The tensile fatigue resistance of vulcanized rubber 2 is better than that of vulcanized rubber 7, which shows that the rubber protective wax of the present invention containing 77PD has better tensile fatigue resistance improvement effect than the rubber protective wax of the present invention containing TMQ.

The tensile fatigue resistance of vulcanized rubber 2 is significantly better than that of vulcanized rubber 8, which shows that compared to adding the antidegradant and the rubber protective wax separately, dispersing the antidegradant in the rubber protective wax in advance to form the rubber protective wax of the present invention improves the tensile fatigue resistance of the rubber.

As can be seen from Table 8 to Table 10, vulcanized rubbers 1 and 2 have a better dynamic protection effect than vulcanized rubber 3 due to the higher content of 77PD in the rubber protective wax. The crack grades of vulcanized rubbers 1 and 2 after 72 h dynamic ozone are 2C, and the flex cracking resistance and tensile fatigue resistance of vulcanized rubbers 1 and 2 are also good, indicating that the protective wax with a higher content of 77PD can provide better protection effects on dynamic ozone resistance, flex cracking resistance, and tensile fatigue resistance.

We claim:

1. A rubber protective wax, comprising
hydrocarbon compounds,
a polyethylene wax, and
an antidegradant,
wherein, based on total mass of the rubber protective wax, the hydrocarbon compounds are in a range of 55% to 94% mass percentage, the polyethylene wax is in a range of 1% to 10% mass percentage, and the antidegradant is in a range of 5% to 35% mass percentage, and
wherein, based on the total mass of the hydrocarbon compounds, the hydrocarbon compounds comprise:
n-alkanes in a range of 50% to 65% mass percentage;
C20-C34 hydrocarbon compounds in a range of 45% to 60% mass percentage;
C35-C45 hydrocarbon compounds in a range of 10% to 25%; and
C45+ hydrocarbon compounds in a range of 20% to 40%.

2. The rubber protective wax of claim 1, wherein, based on the total mass of the hydrocarbon compounds, a composition of the hydrocarbon compounds in the rubber protective wax comprises non-n-alkane in a range of 35% to 39% mass percentage.

3. The rubber protective wax of claim 1, wherein raw materials of the rubber protective wax comprise
a paraffin,
a microcrystalline wax,
the polyethylene wax, and
the antidegradant,
wherein, based on the total mass of the rubber protective wax, the paraffin is in a range of 40% to 70%, the microcrystalline wax is in a range of 15% to 25%, the polyethylene wax is in a range of 1% to 10%, and the antidegradant is in a range of 5% to 35%.

4. The rubber protective wax of claim 3, wherein the melting point of the microcrystalline wax is in a range of 60° C. to 90° C., and the microcrystalline wax comprises one or two selected from a microcrystalline wax with a melting point of ≥70° C. and <77° C., and a microcrystalline wax with a melting point of ≥77° C. and ≤85° C.

5. The rubber protective wax of claim 3, wherein the melting point of the polyethylene wax is in a range of 100° C. to 120° C.

6. The rubber protective wax of claim 3, wherein the antidegradant is selected from one or more of an amine antidegradant, a phenol antidegradant, and a quinoline antidegradant.

7. The rubber protective wax of claim 6, wherein the melting point of the antidegradant is ≤120° C.

8. The rubber protective wax of claim 3, wherein the antidegradant is selected from one or both of an amine antidegradant and a quinoline antidegradant.

9. The rubber protective wax of claim 3, wherein the antidegradant is an amine antidegradant.

10. The rubber protective wax of claim 3, wherein, based on the total mass of the rubber protective wax, the paraffin is in a range of 45% to 66% mass percentage; the microcrystalline wax is in a range of 17% to 24% mass percentage; the polyethylene wax is in a range of 2% to 8% mass percentage; and the antidegradant is in a range of 6% to 35% mass percentage.

11. A rubber protective wax, wherein raw materials of the rubber protective wax comprise
a paraffin,
a microcrystalline wax,
a polyethylene wax, and
an antidegradant,
wherein, based on a total mass of the rubber protective wax, the paraffin is in a range of 40% to 70%, the microcrystalline wax is in a range of 15% to 25%, the polyethylene wax is in a range of 1% to 10%, and the antidegradant is in a range of 5% to 35%, and
the paraffin comprises two or three selected from a paraffin with a melting point of ≥45° C. and <56° C., a paraffin with a melting point of ≥56° C. and <64° C., and a paraffin with a melting point of ≥64° C. and <66° C.

12. The rubber protective wax of claim 11, wherein
the melting point of the microcrystalline wax is in a range of 60° C. to 90° C., and the microcrystalline wax comprises one or two selected from a microcrystalline wax with a melting point of ≥70° C. and <77° C., and a microcrystalline wax with a melting point of ≥77° C. and ≤85° C.;
the melting point of the polyethylene wax is in a range of 100° C. to 120° C.; and
the antidegradant is selected from one or more of an amine antidegradant, a phenol antidegradant, and a quinoline antidegradant.

13. The rubber protective wax of claim 11, wherein, based on the total mass of the rubber protective wax, the paraffin is in a range of 45% to 66% mass percentage; the microcrystalline wax is in a range of 17% to 24% mass percentage; the polyethylene wax is in a range of 2% to 8% mass percentage; and the antidegradant is in a range of 6% to 35% mass percentage.

14. A rubber composition comprising the rubber protective wax as described in claim 1.

15. The rubber composition of claim 14, wherein the formulation of the rubber composition comprises 100 parts by weight of a diene elastomer, 30 to 70 parts by weight of a reinforcing filler, 0.5 to 5 parts by weight of the rubber protective wax, and 0.5 to 3 parts by weight of a crosslinker.

16. A rubber article comprising the rubber composition according to claim 14.

17. A method for preparing the rubber protective wax according to claim 3, comprising:
(1) heating the microcrystalline wax to a temperature in a range of 90° C. to 110° C. and stirring well;
(2) adding the paraffin to the material obtained from step (1) and stirring well;
(3) heating the material obtained from step (2) to a temperature in a range of 130° C. to 140° C., adding the polyethylene wax and the antidegradant, and stirring well.

18. A method for improving thermal oxidative aging resistance, static ozone aging resistance, dynamic ozone aging resistance, flex cracking resistance, and/or tensile fatigue resistance of a rubber composition or a rubber article, comprising
applying the rubber protective wax of claim 1 to a rubber composition or a rubber article.

* * * * *